United States Patent Office

3,107,163
Patented Oct. 15, 1963

3,107,163
METHOD OF PRODUCING PLANTS CONTAINING SUBSTANTIALLY NO ASSIMILATED NICKEL IONS
Earl J. Chaney, Chaney Farms, R.R. 3, Tiffin, Ohio
No Drawing. Filed May 28, 1959, Ser. No. 816,396
2 Claims. (Cl. 71—1)

This invention relates generally to the treatment of material containing plant food and is particularly concerned with a new method of rendering exchangeable heavy metal ions in soils, rock type fertilizer and other materials containing plant food substantially inert as regards their harmful effects on plant cells.

A marked reduction in fertility of soil amounting to as much as 50%, has taken place in certain instances for no apparent reason. I have discovered that such soils contain not only large amounts of heavy metal ions, particularly nickel, zinc, copper and chromium, but also contain excessive amounts of those ions in exchangeable form, that is in a form in which they may be assimilated by plants. I have found that when the amounts of such exchangeable ions exceeds certain fairly well defined maximum amounts, plants grown in such soil will have distorted cells in roots, stalks, branches and leaves. Such cell distortions can be readily detected by use of a microscope, and the presence of the metal ions in the distorted cells can be demonstrated by chemical procedures which convert the metal composition in the cells into crystals which can be observed even by the naked eye.

I have also found that plant cells which have been distorted by the heavy metal ions have far reaching physiological effects on animals and human beings into whose systems the cells are taken in one form or another. In the case of animals, ulcerous and cancerous conditions have been noted where the animals were fed with plants having the distorted cells and containing nickel ions. In the case of human beings, allergies have been traced directly to the consumption of plants or plant fruit grown in soil contaminated with excess amounts of exchangeable nickel ions.

I have found that while zinc, copper and chromium ions tend to cause plant cells distortion, the nickel ions are much more active and exert a greater contaminating effect as well as creating more harmful physiological effects than the other heavy metal ions.

The present invention aims substantially to overcome the plant cell distorting and physiologically-harmful effects of heavy metal ions in materials such as soils in which plants are grown and also in materials which are intended to promote plant growth such as fertilizers, particularly those of organic compounds such as sewerage sludge, milorganite and specially prepared composts and inorganic rock type fertilizers including phosphate rock and limestone.

The present invention achieves that aim by a new method, which, briefly described, comprises the treatment of the material in, or with the assistance of, which plants are grown with a chelating agent under conditions such that the exchangeable heavy metal ions will be chelated and thereby converted into compounds which cannot be assimilated by plants, which do not effect the growth of bacteria, and which may be removed by leaching.

Many, if not all, the agents or compounds which may be used to chelate nickel may be used as chelating agents for the purposes of this invention. Such suitable compounds should be water soluble and should form the water soluble compounds with exchangeable nickel. One class of compounds suitable for use as chelating agents for the purposes of this invention is the class of organic compounds containing one or more carboxyl groups (—COOH), preferably from 1 to 4 or 5 or possibly more of such groups. This class of compounds is exemplified by acetic acid, oxalic acid, citric acid and their salts and certain salts of ethylenediaminetetraacetic acid (EDTA). It is to be understood that many salts of these acids and other chelating acids may be used in lieu of the acids themselves for the purpose of this invention. For example, alkaline earth metal salts of any of the foregoing acids are, generally speaking, the equivalents of the acids for the present invention. In general, it may be said that any chelating agent including a base metal which is replaceable by nickel may be used for the purpose of this invention. Common metals which are so replaceable by nickel include zinc, cadmium, cobalt, ferrous iron, manganese, calcium and magnesium, these metals being arranged in the order of their displacement, that is, each will displace those following it.

The manner of carrying out the present invention may be varied, but essentially it includes mixing the chelating agent with soil contaminated with heavy metal ions. If this agent is in liquid form it may be sprayed onto the soil but if it is applied as a finely divided solid, it is mixed with the soil as by harrowing, rototilling or the like, and then water is added to dissolve the agent. The chelating agent in the presence of water reacts with the exchangeable heavy metal ions, thereby chemically tying up or sequestering those ions, and making them not readily assimilable by plant cells. Leaching the soil containing the chelating agent may result in dissolving and washing away much of the so chelated exchangeable heavy metal ions.

The following examples will show the results of the present invention as well as a convenient way to practice the invention.

Soil containing about 300 parts per million (p.p.m.) of total nickel, of which between about 13 and about 15 p.p.m. were exchangeable, was divided into four lots. Plants were grown in the first lot of this soil without any treatment being applied to the soil. At the end of 67 days the plants had reached a height of 27", contained distorted cells and the stalks were weak and crooked. The nickel content in these plants was about 118.0 p.p.m.

Plants were grown in the second lot of such soil to which had been added a commercial mixed fertilizer in the proportion of about 200 pounds per acre. At the end of the same 67 days the plants grown in this second lot of soil had reached the height of 24". These plants were quite similar to those in the first lot of soil and contained approximately the same content of nickel. The essential difference between the plants of the first and second lots of plants was that the root cells of those grown in the second lot were distorted to a greater extent than those grown in the first lot, that is the fertilizer had apparently interfered with the plant growth and had increased the cell distortion.

Citric acid in the proportion of about 200 pounds per acre was added in the form of crystals to the third lot of soil and was mixed with the soil. The soil was leached every day for seven days before planting. The plants grown in that soil attained a height of 46" in the same 67 days. These plants did not contain any distorted cells and their nickel content was only about 17.3 p.p.m.

To the fourth lot of the soil citric acid was added as described above in connection with the third lot of soil and, after leaching, a chemically pure reagent plant nutrient was added. The plants grown in that soil in the same 67 days attained a height of 58", contained no distorted cells and only about 17.3 p.p.m. of nickel.

Other similar comparative tests were made on eight different soils having total nickel concentrations varying from about 230.0 p.p.m. to about 575.0 p.p.m. and exchangeable nickel ranging from about 2.7 to about 7.5 p.p.m. Four plats were prepared from each of the eight samples of soil. A first group of eight plats consisted of the untreated soil, a second group of eight plats consisted of the untreated soil together with a commercial grade of mixed fertilizer, a third group of eight plats consisted of the contaminated soil which had been treated with citric acid then leached out but not fertilized, and a fourth group of eight plats consisted of the contaminated soil treated with citric acid and leached, both as just described, and then fertilized with chemically pure reagent plant nutrients.

At the end of 9 weeks the plants grown in the fourth group of plats were from 30% to 50% larger on the average than the plants grown in the first and third groups of plats and from 20% to 30% larger on the average than the plants grown in the second group of plats.

Numerous other experiments have been conducted, the net result of all of which, including those just stated indicate that when chelating agents, particularly organic compounds containing from one to four carboxyl groups are employed, the chelating treatment seems to inactivate or make non-exchangeable or reduce the concentration of exchangeable heavy metal ions, particularly nickel, which are present in plant producing soils as well as in some of the naturally assimilable plant food supplements, such as fertilizers. Another advantage is that the deleterious effects of exchangeable heavy metal ions on plant growth can be controlled or reduced with resultant more luxurient growth of plants with normal cell structure. Another and very important advantage is that the soils can have much, if not all, of their fertility restored, which was reduced incident to the concentration of heavy metal ions therein, this restoration of fertility being traceable to the decontaminating effect of the chelating agent.

A further and most important result is the prevention of accumulation or build up of nickel content in the blood and bodies of man and animals from the ingestion of food stuffs containing higher concentrations of nickel, such as occurs when plants or food stuffs are grown in soil contaminated with nickel ions in a form assimilable by the plant cells.

One source of contamination of soil with nickel ions is mixed fertilizers which may contain from 500 p.p.m. to 700 p.p.m. with the exchangeable nickel ranging from about 2 to about 5 p.p.m. of total nickel with as much as 30 p.p.m. being readily exchangeable. Soils which have been treated with recommended amounts of certain dry mixed fertilizers have been found to contain from about 230 p.p.m. to as much as 670 p.p.m. of total nickel concentrations with between about 2 and about 5 p.p.m. being immediately exchangeable nickel. Plants grown in such soils have been found to contain from about 24 p.p.m. to about 85 p.p.m. of nickel.

The nickel content in the blood of a healthy human averages approximately 30 p.p.m. and this amount has also been found to be present in the blood of many animals. Apparently about 30 p.p.m. of nickel may be present in the blood of man and beast without any attendant abnormalities. However, tests made with laboratory animals fed with foodstuffs containing about 100 p.p.m. developed carcinogenic effects. In some instances the nickel concentration in the blood of animals reached several hundred p.p.m.

While it is to be understood that no definite formula can be laid down as to how much of any particular chelating agent should be used on an acre of land since conditions in the soil vary widely as well as the content of the exchangeable nickel ions, the following information will enable those skilled in the art to adjust their procedure to the particular conditions encountered and obtain the benefits of the present invention without experimentation.

In general it may be said that as stated in the foregoing example in which citric acid was used that the application of 200 pounds per acre of citric acid followed by daily watering for seven days not only chelated the exchangeable nickel before the seeds were planted but reduced the total concentration of nickel from about 425 p.p.m. to about 350 p.p.m. and that the plants grown in such soil contained about 100 p.p.m. less nickel than plants grown in the same soil but not given that treatment. After the amount of exchangeable nickel is determined, the amount of chelating agent needed to chelate such nickel may be calculated and an additional amount of the agent should be used to be certain that all such nickel is sequestered and to chelate any nickel which is converted into exchangeable form after the agent is added. For example, a soil having about 10 p.p.m. of exchangeable nickel would have about 32.68 pounds of exchangeable nickel per acre. Since it takes about five times as much tetra sodium EDTA to chelate a unit of nickel, approximately 168 pounds of tetra sodium EDTA would chelate the nickel in an acre of soil containing about 32.68 pounds of nickel. As an additional safety factor of 100%, about 330 pounds of sodium EDTA should be used to insure a control of a concentration of about 10 p.p.m. of exchangeable nickel in an acre of such soil.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. The method of producing plants containing substantially no assimilated nickel ions, and thereby avoiding the harmful physiological effects which are traceable to the presence in the systems of humans and animals of nickel ions derived from plants, said method comprising the steps of:

(a) determining the amount of plant-assimilable nickel ions in the soil in which plants are to be grown, (b) selecting a chelating agent containing at least one acid radical from the group of organic compounds consisting of acetic acid, oxalic acid, citric acid and ethylene diamine tetra acetic acid, (c) calculating the amount of the selected chelating agent required to chelate the amount of nickel ions in the soil as so determined, (d) bringing at least the calculated amount of said selected chelating agent into contact with the nickel ions in the soil together with water and thereby converting substantially all such nickel ions into a water soluble, organic, nickel salt which is stable against decomposition and subsequent assimilation of the nickel ions by the plant, (e) and growing plants in the thus treated soil.

2. The method of producing plants containing substantially no assimilated nickel ions, and thereby avoiding the harmful physiological effects which are traceable to the presence in the systems of humans and animals of nickel ions derived from plants, said method comprising the steps of:

(a) determining the amount of plant-assimilable nickel ions in the soil in which plants are to be grown, (b) selecting a chelating agent containing at least one acid radical from the group of organic compounds consisting of acetic acid, oxalic acid, citric acid and ethylene diamine tetra acetic acid, (c) calculating the amount of the selected chelating agent required to chelate the amount of nickel ions in the soil as so determined, (d) bringing approximately twice the calculated amount of said selected chelating agent into contact with the nickel ions in the soil together with water and thereby converting substantially all such nickel ions into a water soluble, organic, nickel salt which is stable against decomposition and subsequent assimilation of the nickel ions by the plant, (e) and growing plants in the thus treated soil.

References Cited in the file of this patent

UNITED STATES PATENTS 2,772,151 Nikitin ---------------- Nov. 27, 1956
2,808,435 Young ------------------ Oct. 1, 1957
2,828,182 Cheronis -------------- Mar. 25, 1958

OTHER REFERENCES

Citrus Magazine, "Iron Chlorosis," Steward et al., June 1952, pages 22–25, vol. 14, No. 10.

Soil Science, "Uptake of Chelated Metals by Plants," De Kock, P. C., et al., vol. 84, pages 55–62, July 1957.